US008517238B2

(12) United States Patent
Gensmann et al.

(10) Patent No.: US 8,517,238 B2
(45) Date of Patent: Aug. 27, 2013

(54) FASTENER ASSEMBLY (75) Inventors: Stefan Gensmann, Fruecht (DE);
Michael Kunz, Dorndorf (DE); Markus Rompel, Runkel/Schadeck (DE)

(73) Assignee: Black & Decker Inc., Newark, DE (US)

( * ) Notice: Subject to any disclaimer, the term of this patent is extended or adjusted under 35 U.S.C. 154(b) by 297 days.

(21) Appl. No.: 12/907,288

(22) Filed: Oct. 19, 2010

(65) Prior Publication Data
US 2012/0048909 A1 Mar. 1, 2012

(30) Foreign Application Priority Data

Aug. 26, 2010 (EP) .................................. 10174225

(51) Int. Cl.
*B25C 1/00* (2006.01)

(52) U.S. Cl.
USPC ............ 227/136; 227/135; 206/338; 206/343

(58) Field of Classification Search
USPC ......... 227/135, 136, 119, 120, 121; 206/338, 206/343
See application file for complete search history.

(56) References Cited

U.S. PATENT DOCUMENTS

| | | | | |
|---|---|---|---|---|
| 2,525,637 A * | 10/1950 | Bell | | 227/137 |
| 3,830,364 A * | 8/1974 | Hedlund | | 206/338 |
| 3,858,782 A | 1/1975 | Pomeroy | | |
| 3,885,669 A * | 5/1975 | Potucek | | 206/338 |
| 3,891,087 A | 6/1975 | Maynard | | |
| 3,910,324 A * | 10/1975 | Nasiatka | | 81/434 |
| 3,915,367 A * | 10/1975 | Potucek | | 227/136 |
| 3,930,297 A * | 1/1976 | Potucek et al. | | 29/431 |
| 4,251,017 A * | 2/1981 | Doyle et al. | | 227/8 |
| 4,367,837 A * | 1/1983 | Manino | | 227/136 |
| 4,383,608 A * | 5/1983 | Potucek | | 206/347 |
| 4,581,964 A * | 4/1986 | Takatsuru | | 81/464 |
| 4,606,455 A | 8/1986 | Grikis et al. | | |
| 5,096,061 A * | 3/1992 | Wakai | | 206/347 |
| 5,615,819 A | 4/1997 | Hon et al. | | |
| 6,024,268 A * | 2/2000 | Horng-Lin | | 227/120 |
| 6,098,801 A * | 8/2000 | McCardle et al. | | 206/443 |
| 6,494,322 B1 | 12/2002 | Habermehl et al. | | |
| 6,823,990 B2 * | 11/2004 | Gaudron | | 206/347 |
| 7,021,462 B2 * | 4/2006 | Powers et al. | | 206/338 |
| D605,016 S * | 12/2009 | Jin | | D8/70 |
| 7,735,577 B2 * | 6/2010 | Gaudron | | 173/171 |
| 2002/0092784 A1 * | 7/2002 | Gaudron | | 206/347 |
| 2004/0118720 A1 * | 6/2004 | Powers et al. | | 206/346 |
| 2005/0031436 A1 | 2/2005 | Yoshizawa et al. | | |

FOREIGN PATENT DOCUMENTS

| | | |
|---|---|---|
| DE | 19957109 A1 | 5/2001 |
| DE | 20307515 U1 | 8/2003 |
| WO | 2009022372 A1 | 2/2009 |

OTHER PUBLICATIONS

Poell, Andreas—European Search Report (EP 10174225)—Feb. 19, 2013—Munich.

* cited by examiner

*Primary Examiner* — Brian D Nash (74) *Attorney, Agent, or Firm* — Rhonda Barton; Adan Ayala (57) ABSTRACT

A fastener assembly includes an elongate fastener, and a support collar mounted on the elongate fastener. The support collar is shaped such that it has profiles on opposite sides of the elongate fastener that are asymmetric with respect to each other. The asymmetry may be an asymmetry in the number, shape, position, or size of recesses on two opposite sides of the elongate fastener. A plurality of fastener assemblies may be provided as a fastener strip, in which each support collar is joined to one or two adjacent support collars in a strip.

24 Claims, 7 Drawing Sheets

FASTENER ASSEMBLY

CROSS-REFERENCE TO RELATED APPLICATIONS

The present application claims priority to European Patent Application No. 10174225.2 filed Aug. 26, 2010. European Patent Application No. 10174225.2 is incorporated by reference in its entirety.

BACKGROUND OF THE INVENTION

1. Field of the Invention

The present invention relates to supports and support collars for elongate fasteners such as nails, pins, screws and the like, and fastener assemblies comprising such supports and support collars mounted on elongate fasteners. The invention particularly relates to strips of such fastener assemblies, in which the support collars are joined together, thereby providing strips of collated fasteners. The invention also relates to fastener-driving tools for such fastener assembly strips.

2. Description of the Related Art

Many fastener-driving tools include a driver that is propelled rapidly against a fastener to drive a fastener from the tool into a workpiece. The driver may include a piston, or a ram or impact member, for example. The driver may be propelled in any of a variety of ways, including pneumatically, by combustion, by means of a strap or chain, by means of a separate piston, or by means of one or more flywheels, for example.

Fastener-driving or firing tools have for many years included magazines such as holding and supply devices for the fasteners that are driven/fired from the tools. There are various known types of such magazines, including magazines arranged to store and supply loose fasteners, magazines for coiled strips of fasteners, and magazines for straight or curved strips of fasteners.

U.S. Pat. No. 5,069,340 discloses a strip of collated elongate fasteners in which a carrier molded from a polymeric material has a sleeve for each fastener. Each sleeve has an annular portion, and a breakable portion which breaks into two segments as the fastener gripped by the sleeve is driven from a fastener-driving tool. The breakable portion has a pair of similar, laterally opposed, outwardly opening, continuously curved concave recesses with open windows from which portions of the fastener emerges. In a fastener-driving tool, parallel ribs of a guiding device fit into such recesses, so as to guide the strip between such ribs. In use, the strip of collated fasteners is advanced incrementally towards a fastener-driving region, such that the leading fastener and its sleeve are driven from the tool into a workpiece.

U.S. Pat. No. 3,438,487 discloses a carrier for holding a plurality of fasteners with their shanks in a spaced-apart parallel relation, comprising an elongate flexible strip. The strip includes a web transversely spaced apart from the fastener shanks, and a plurality of slotted flanges along the upper and lower edges of the web extending substantially perpendicular to the web, for supporting the shank of each fastener. In this arrangement, when each fastener is driven from a fastener-driving tool, the fastener is separated from the carrier strip, and the carrier strip remains attached to the tool.

U.S. Pat. No. 3,830,364 discloses a nail carrier for supporting and locating nails to be fed to a power-operated nail driving device. The carrier includes a rigid plate having, on its top side, a first group of rigid studs arranged in two parallel spaced-apart rows and a second group of yielding studs disposed in one row parallel to the other two rows, and extending from the underside of the plate are reinforcing flanges. Two studs of the first group in conjunction with one stud of the second group provide a locating position for a nail, and this is repeated along the nail carrier.

The present invention seeks to provide improved fastener supports and support collars, fastener assemblies, strips of support collars and assemblies, and fastener-driving tools.

SUMMARY OF THE INVENTION

In a first aspect, the present invention provides a fastener assembly, including an elongate fastener, and a support collar mounted on the fastener. The support collar is shaped such that it has profiles on opposite sides of the fastener that are asymmetric with respect to each other.

A second aspect of the invention provides a support collar for an elongate fastener. The support collar is shaped such that it has profiles on opposite sides of a longitudinal axis of the collar that are asymmetric with respect to each other. In use, the support collar is mounted on (i.e. around) an elongate fastener such that the fastener extends along the longitudinal axis of the collar.

The support collar preferably includes a single part, but in some embodiments of the invention the support collar may include two or more separate parts which, at least when mounted on a fastener, combine to form the support collar. For example, the support collar may include two separate collar components which, at least when mounted on a fastener, combine to provide the asymmetric profiles.

By the "profile" of a side of the support collar is meant the outline of that side of the support collar when viewed from a direction substantially perpendicular to that side, i.e. the outline of the side when viewed in profile.

Preferably, the asymmetry in the collar profiles on opposite sides of the fastener (i.e. on opposite sides of the longitudinal axis of the collar) includes a longitudinal asymmetry along at least part of the length of the elongate fastener along the longitudinal axis thereof. Preferably the maximum distances, of both opposite profiles, from the longitudinal axis of the collar are substantially equal.

The profiles on two opposite sides of the fastener preferably each include at least one recess. The asymmetry preferably includes an asymmetry in the recesses on the two opposite sides of the fastener.

An advantage of the present invention is that the asymmetry in the profiles on opposite sides of the support collar, thus, on opposite sides of the fastener, can help to prevent the fastener assemblies being inserted into, and/or driven from, a fastener-driving tool in an incorrect orientation. For example, a passage within a fastener magazine and/or part of a nose piece of a fastener-driving tool may be provided with corresponding asymmetric profiles arranged to guide the support collar(s) of the invention, for example, towards an outlet passage for the fasteners, and with which the asymmetric profiles of the support collar(s) are arranged to fit. The lack of symmetry on opposite sides of the fastener assemblies can thus require the user to insert the fastener assemblies into the tool in the correct orientation for the tool, and in this way it can lessen the likelihood of fastener assemblies jamming in the tool, etc.

Another possible advantage of the invention is that the asymmetry in the profiles can help to provide improved guidance of the fastener assemblies in a fastener-driving tool (e.g. in a magazine and/or in a nose piece). For example, in the fastener assembly arrangement disclosed in U.S. Pat. No. 5,069,340 described above, the support collar has symmetric profiles on opposite sides of the fastener, with identically positioned and shaped single recesses on each side, each of which cooperates with a single respective protruding rib in a passage of a fastener-driving tool. Arrangements such as this, especially those in which there is a single identical recess on each side of the fastener assembly, can sometimes fail to prevent twisting of the fastener assemblies (e.g. by the recesses of the fastener assembly rotating about their respective protruding ribs), thereby resulting in them being jammed within the tool. In contrast, if fastener assemblies with asymmetric profiles are used, this enables the possibility of better guiding to prevent twisting. For example, if a fastener assembly is provided with two recesses on one side, and a single recess or three recesses, on the opposite side, there may be less chance of the recesses of the fastener assembly rotating about their respective protruding ribs, and thus less chance of jamming. The provision of a single recess on one side, and two recesses on the opposite side, is a particularly simple and convenient way of achieving this, for example.

A further possible advantage of the invention concerns the performance of a fastener in use, after it has been driven from a fastening-driving tool. As explained in U.S. Pat. No. 5,069,340, it is often desirable for at least part of the support collar of a fastener assembly to be retained on the fastener after the fastener has been driven into a workpiece. This is advantageous because the presence of at least part of the support collar between, for example, the head of a nail or pin and the workpiece can avoid the occurrence of a gap between the head and the workpiece, thus providing a more secure attachment of a workpiece to a substrate. Additionally, any resilient compressibility provided by the support collar can prevent such a gap appearing or widening over time, due to vibration, etc., for example. A disadvantage of the type of symmetrical support collar disclosed in U.S. Pat. No. 5,069,340 is that the part of the support collar that remains attached to the fastener is an annular block of material, which has moderately low resilient compressibility. In contrast, with at least some asymmetric support collars of the present invention, it may be possible to provide additional resilient compressibility (i.e. "springiness") from the shape of the support collar. This will be explained further, below.

As mentioned above, the profiles on the two opposite sides of the fastener may each include at least one recess. The asymmetry may thus include an asymmetry in the number of recesses. For example, the support collar may have a single recess on one side of the fastener, and two or more recesses on the opposite side of the fastener, or the support collar may have two recesses on one side of the fastener, and three or more recesses on the opposite side of the fastener. Other numbers of recesses are possible.

Additionally or alternatively, the asymmetry may include an asymmetry in the positions and/or shapes and/or sizes and/or orientations of the recesses. For example, recesses on opposite sides of the fastener may have a mutually off-set or staggered arrangement. In a preferred embodiment of the invention, the recesses alternate between the two opposite sides of the fastener, along part of the length of the fastener. For example, at least part of one recess on one side of the fastener may be situated between at least parts of two recesses on the opposite side of the fastener.

Preferably, at least one recess is generally V-shaped in profile. Advantageously, each recess may be generally V-shaped, but other shapes are possible. If each recess is V-shaped or some other basic shape, recesses on opposite sides of the fastener may nonetheless have different shapes, such as, for example, different V-shapes.

Each recess in the sides of the support collar preferably is sufficiently deep that it exposes part of the elongate fastener extending through the support collar. However, in some embodiments of the invention, it is possible for one or more recesses not to expose part of the elongate fastener.

A third aspect of the invention provides a fastener assembly, including an elongate fastener, and a support mounted on the fastener, the support shaped such that it has profiles on two opposite sides of the fastener that are asymmetric with respect to each other, each profile including at least one recess that is sufficiently deep that it exposes part of the elongate fastener to which the support is mounted. Preferably the support includes a support collar.

The support collar preferably includes an end surface at one or both opposite ends thereof, which substantially encircles part of the elongate fastener. Additionally or alternatively, the support collar may include a flange at one or both opposite ends thereof. Preferably, the flange is substantially annular and encircles part of the elongate fastener. Advantageously, the end surface or flange is not perpendicular to a longitudinal axis of the elongate fastener. For example, the end surface or flange may be inclined at substantially the same angle as an angle of inclination of an entire strip of fasteners or support collars, described below.

A fourth aspect of the invention provides a fastener strip including a plurality of fastener assemblies according to the first aspect of the invention, in which each support collar is joined to one or two adjacent support collars in a strip.

A fifth aspect of the invention provides a strip of fastener support collars, including a plurality of support collars according to the second aspect of the invention, in which each support collar is joined to one or two adjacent support collars.

The strip of support collars preferably includes a single part molded in one piece, for example, but in some embodiments of the invention the strip of support collars may include two or more separate parts which, at least when mounted on the fasteners, combine to form the strip of support collars. For example, the strip of support collars may include two separate strips which, at least when mounted on a fastener, combine to provide the strip of support collars.

Preferably, the asymmetric profiles are on opposite sides of the fastener strip or on opposite sides of the strip of fastener support collars. That is, the asymmetric profiles preferably are situated on sides of the support collars that form opposite sides of a strip rather than on sides of the support collars that are situated adjacent to adjacent collars in the strip. Preferably, in a fastener strip or support collar strip, the support collar profiles on one side of the strip are substantially identical to each other and preferably are arranged substantially in a straight line. The support collar profiles on the opposite side of the strip preferably are substantially identical to each other, but lacking symmetry with the first side of the strip, and preferably are arranged substantially in a straight line.

A sixth aspect of the invention provides a fastener strip including a plurality of fastener assemblies according to the third aspect of the invention, in which each support is joined to one or two adjacent supports in a strip. The strip of supports preferably includes a single part molded in one piece, for example, but in some embodiments of the invention the strip of supports may include two or more separate parts which, at least when mounted on the fasteners, combine to form the strip of supports.

A seventh aspect of the invention provides a combination of a fastener-driving tool and a fastener assembly or strip, in which the fastener-driving tool has a fastener supply passage provided with profiles on opposite sides thereof that are asymmetric with respect to each other, and the fastener assembly or strip is arranged to fit in the supply passage.

Preferably the fastener assembly or strip is a fastener assembly or strip according to the first, third, fourth or sixth aspect of the invention.

Advantageously, the fastener/support collar strip may be substantially straight, or it may curve. The axes of the fasteners/support collars preferably lie in a plane, and in this plane the strip may be straight or curved, for example. Preferably, the axes are substantially parallel to each other, in which case the strip will normally be straight, but the axes may alternatively be non-parallel to each other, in which case the strip may be curved. The support collars may be arranged such that there is no longitudinal displacement between them (i.e. they are next to each other in a straight row), or each support collar may be longitudinally displaced with respect to an adjacent support collar, e.g. such that the strip as a whole is inclined with respect to the longitudinal axes of the elongate fasteners and support collars.

BRIEF DESCRIPTION OF THE DRAWINGS

Preferred embodiments of the invention will now be described, by way of example, with reference to the accompanying drawings, of which:

FIGS. 4(a) and 4(b) show opposite ends of the strip of fastener assemblies as shown in FIGS. 2(a)(b) and 3(a)(b)

DETAILED DESCRIPTION OF THE INVENTION

Figure 1:
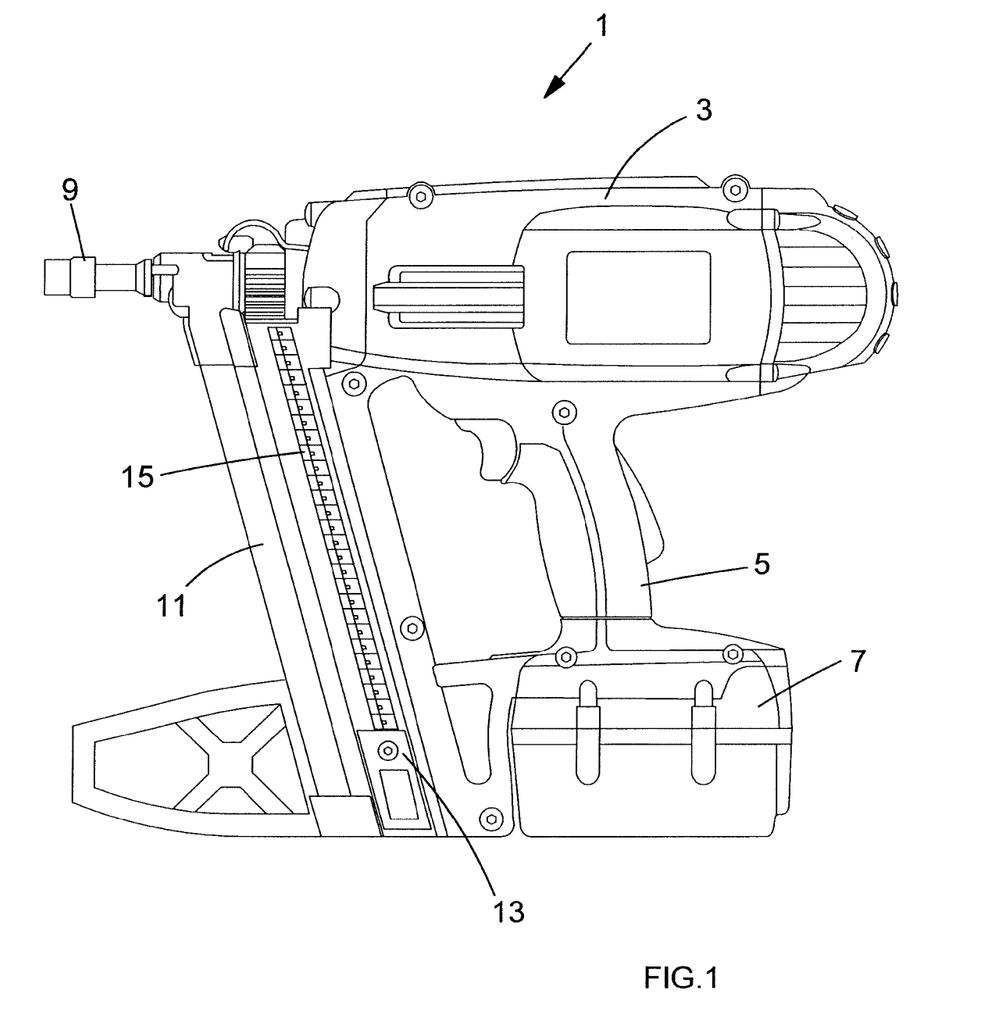
FIG. 1 shows a fastening driving tool according to the invention, with a magazine loaded with fastener assemblies according to the invention.

FIG. 1 shows a fastener-driving tool 1, including a main body 3 housing a fastener-driving mechanism, a handle 5, a battery 7, a nose piece 9, and a fastener magazine 11. The fastener magazine 11 is loaded with one or more strips 15 of fastener assemblies according to the invention (shown schematically). The magazine, which is inclined with respect to the nose piece 9 to provide good accessibility to a workpiece, holds the fastener assemblies and supplies them to the nose piece by means of a spring-loaded pusher 13.

Figure 2A:
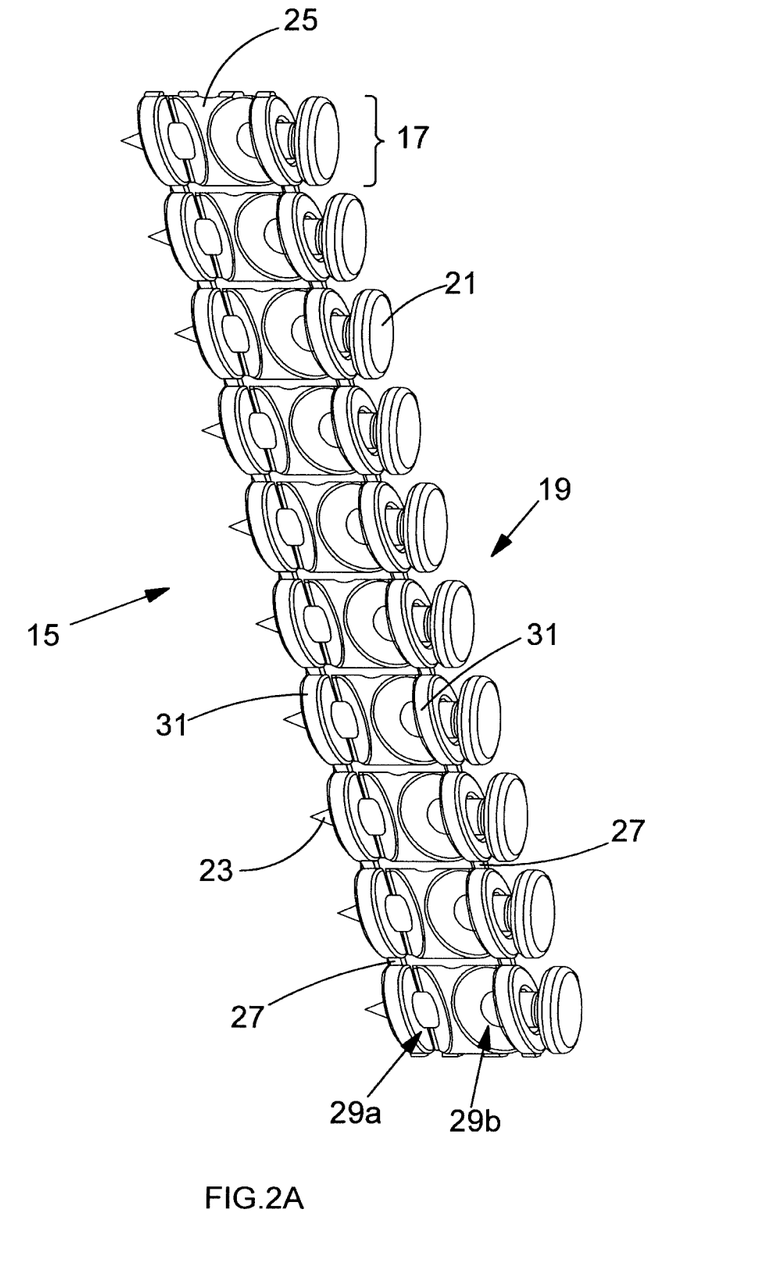
FIGS. 2(a) 2(b) show two views of one side of a strip of fastener assemblies according to the invention.
Figure 2B:
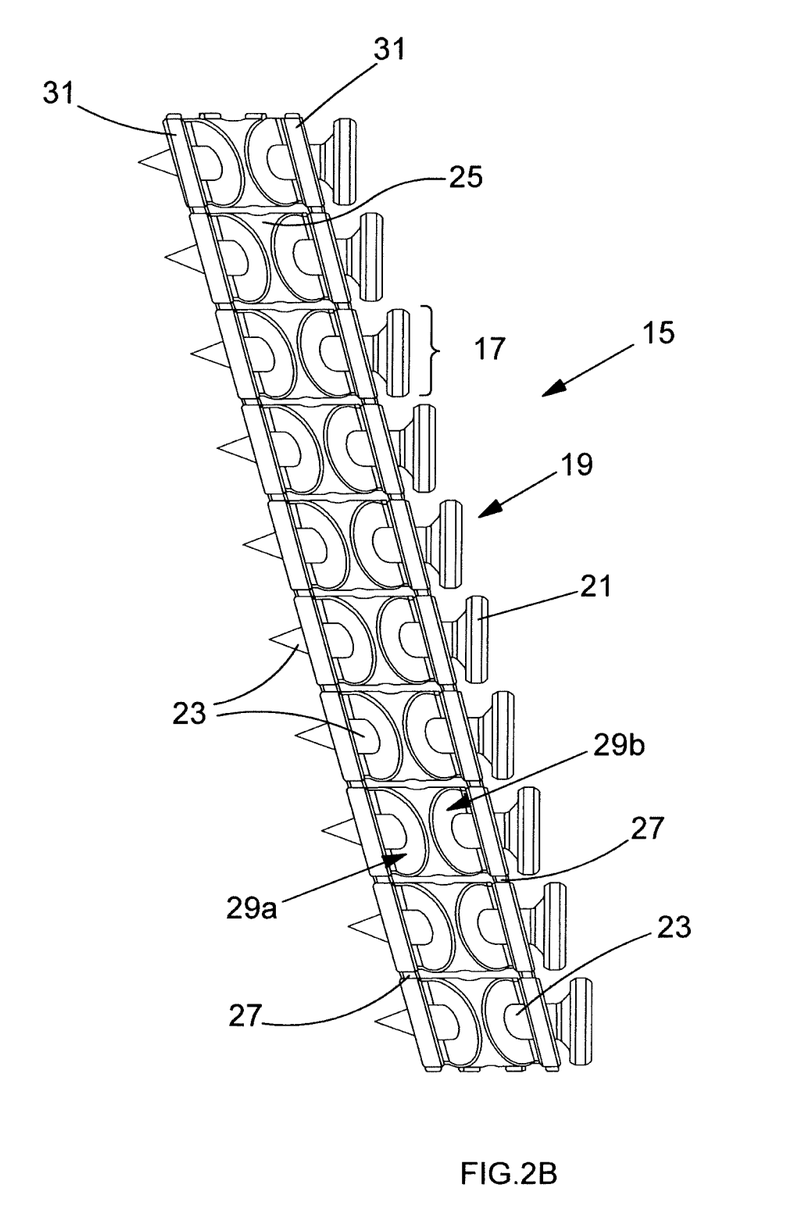
Figure 3A:
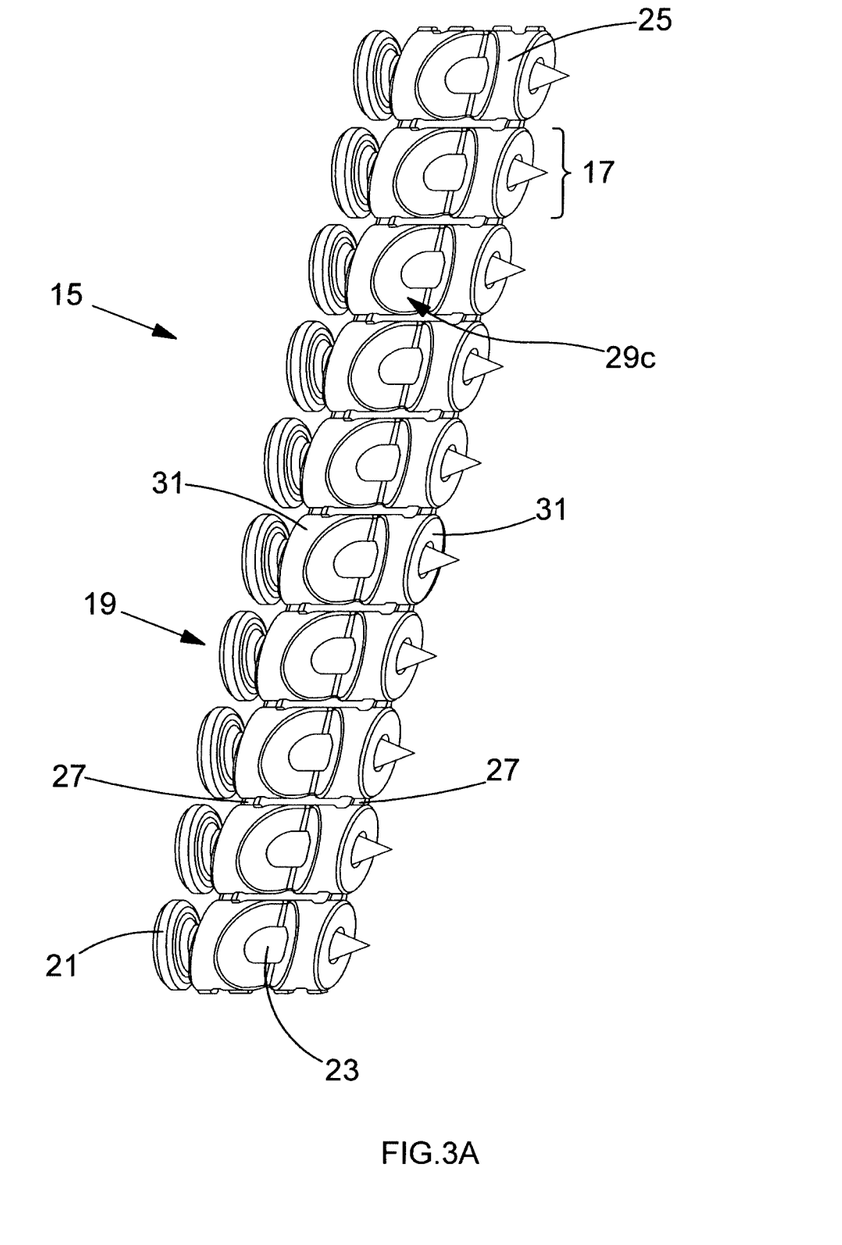
FIGS. 3(a) and 3(b) show two views of the opposite side of the strip of fastener assemblies as shown in FIG. 2.
Figure 3B:
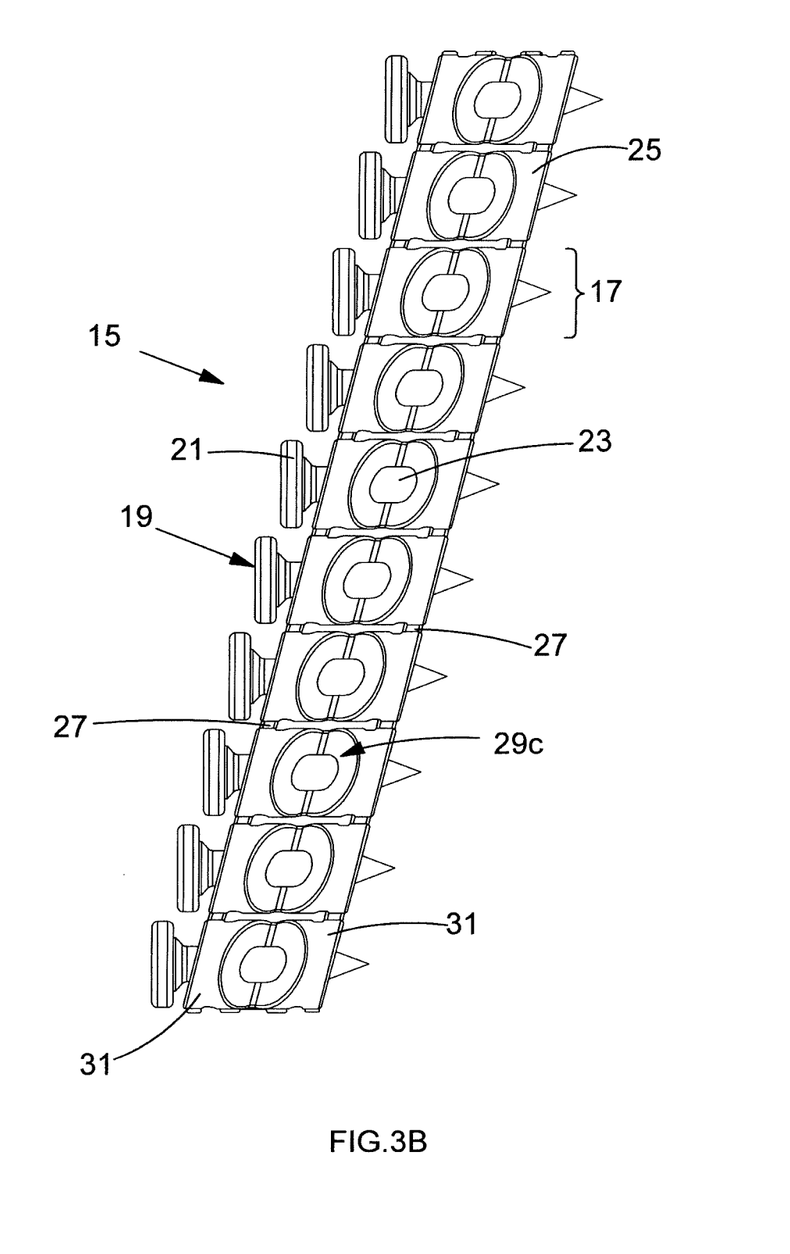

FIGS. 2 and 3 (views (a) and (b)) show opposite sides of a strip 15 of fastener assemblies 17 according to the invention. Each fastener assembly 17 includes an elongate fastener 19, such as, for example, a nail or pin, including a head 21 and a pointed shank 23, and a support collar 25 mounted on the fastener. The fastener 19 will normally be formed from metal, such as, for example, steel and the support collar 25 will normally be formed for example by molding from a polymeric material.

The strip 15 of fastener assemblies 17 includes a strip of support collars 25 arranged in a substantially straight line with each support collar joined to one or two adjacent support collars, and with a respective elongate fastener 19 located in each support collar. Adjacent support collars 15 are joined to each other by means of breakable webs 27. The strip of support collars 15, including the breakable webs 27, includes a single molded polymeric article. In use, when an end fastener 19 of the strip 15 is driven from a tool, such as the tool 1 shown in FIG. 1, by a ram or other impact device, the support collar 25 located on the fastener is forcibly disconnected from its adjacent support collar, and the fastener 19 together with its support collar 25 is driven from the tool into a workpiece.

The fasteners 19 of the strip 15 are all substantially parallel to each other, but each fastener 19 and support collar 25 is longitudinally displaced with respect to adjacent fasteners and support collars, so that the entire strip 15 of fastener assemblies 17 is inclined with respect to the longitudinal axes of the elongate fasteners and support collars. This arrangement allows the strip 15 to fit into an inclined magazine 11 of a fastener-driving tool 1.

Figure 4A:
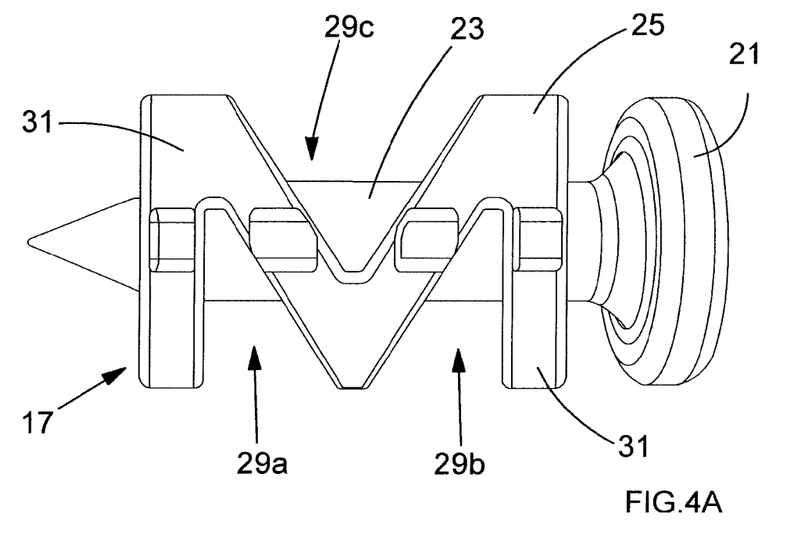
Figure 4B:
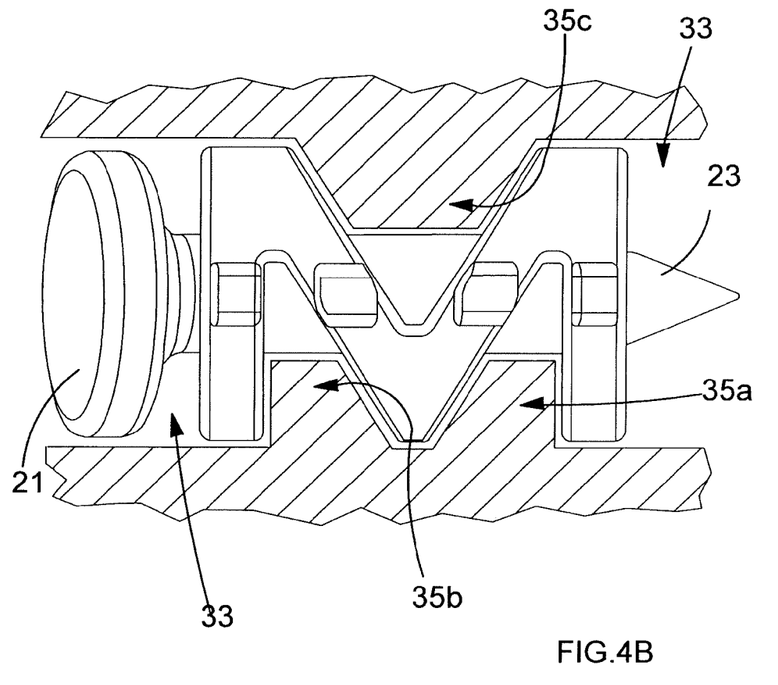
FIG. 4(b) shows the fastener strip located in a fastener supply passage of a fastener-driving tool according to the invention.
Figure 5:
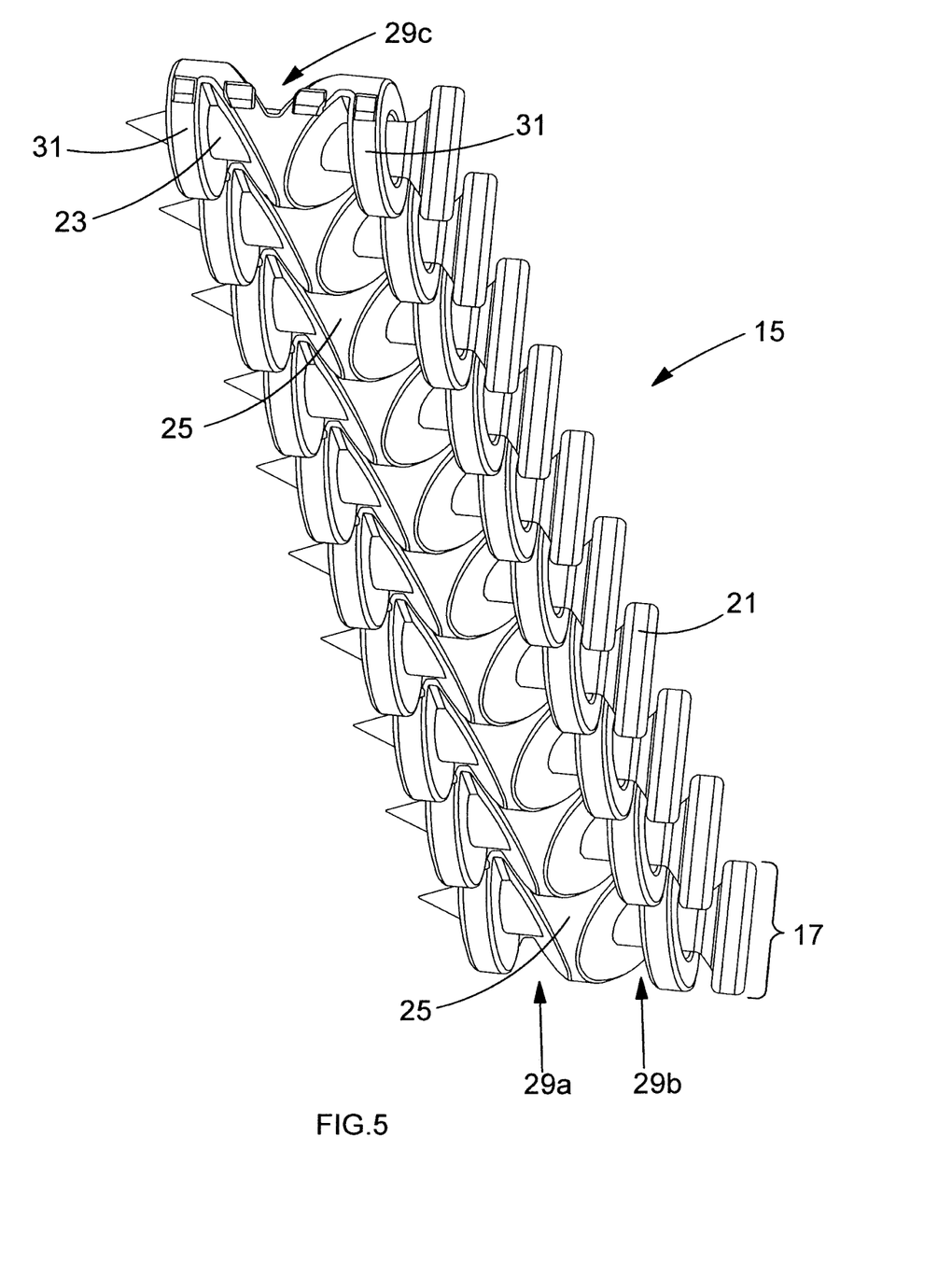
FIG. 5 shows a further view of the strip of fastener assemblies as shown in FIGS. 2(a) through 4(b).

Each support collar 25 of the strip 15 is shaped such that it has profiles on opposite sides of the fastener, and on opposite sides of the strip, that are asymmetric with respect to each other. In particular, one side of each support collar and one side of each strip has two recesses 29a and 29b, whereas the opposite side of each support collar and the opposite side of each strip has a single recess 29c. The recesses have a staggered relationship as seen in FIGS. 4 and 5 in which part of single recess 29c on one side of the fastener is situated between parts of the two recesses 29a and 29b on the opposite side of the fastener. Also as shown in FIGS. 4 and 5, all three recesses 29a, 29b and 29c are generally V-shaped in profile, but the profile area or cross-sectional area of the single recess 29c is approximately twice that of the profile area of each of recesses 29a and 29b, such that the combined profile area of the two recesses 29a and 29b is approximately the same as that of the single recess 29c. Each recess 29a, 29b, and 29c is sufficiently deep that part of the shank 23 of the elongate fastener 19 is exposed by the recess. All of the recesses are inclined at substantially the same angle of inclination (approximately 15 degrees, as drawn) as that of the entire strip 15, and each recess is in line with the corresponding recesses of the other support collars in the strip. Additionally, each support collar 25 includes a flange 31 at each end of the collar, and each flange is also inclined at substantially the same angle of inclination as that of the entire strip 15.

In profile, each support collar 25 is shaped generally like the letter "M". This general shape, which is analogous to a concertina, can help to provide a degree of resilient compressibility or springiness in use between the fastener head 21 and a workpiece, when a fastener assembly 17 has been driven from the tool 1. Even if part of the support collar 25 splits as the fastener assembly is driven into a workpiece, often part of the support collar (for example, one or two "V" shapes of the "M" shaped profile) will remain, thus providing additional resilient compressibility compared to the resilient compressibility of a simple block of the material of the support collar.

As shown in FIG. 4(b), a passage 33 within a fastener magazine and/or part of a nose piece of the fastener-driving tool 1 is provided with asymmetric profiles on opposite sides, e.g. corresponding to the asymmetric profiles of the support collar 25) namely a pair of protruding ribs 35a and 35b on one side, and a single protruding rib 35c on the opposite side. Each recess in the support collar 25, and thus each line of recesses in the strip is arranged to accommodate a respective protruding rib of the passage 33. The lack of symmetry on opposite sides of the fastener assemblies 17 thus requires the user to insert the fastener assemblies into the tool 1 in the correct orientation for the tool, and in this way it can lessen the likelihood of fastener assemblies jamming in the tool, etc. Additionally, the staggered arrangement of the cooperating ribs and recesses provides good guidance of the fastener assemblies in the passage 33, again lessening the chance of fastener assemblies jamming in the tool.

It will be understood that the above description and the drawings are of particular examples of the invention, but that other examples of the invention are included in the scope of the claims.

The invention claimed is:

1. A fastener assembly, comprising:
an elongate fastener having a longitudinal axis, and
a support collar mounted on and circumscribing the elongate fastener, the support collar shaped to have profiles on opposite lateral sides of the elongate fastener, each profile having at least one recess, the profiles having an asymmetry with respect to each other along the longitudinal axis for at least a part of the length of the of the elongate fastener,
wherein the asymmetry comprises an asymmetry in at least one of the number, shapes and sizes of the recesses.

2. The fastener assembly according to claim 1, wherein the asymmetry comprises an asymmetry of the recesses on the opposite lateral sides of the elongate fastener.

3. The fastener assembly according to claim 1, wherein the support collar has a single recess on one side of the elongate fastener, and at least two recesses on an opposite side of the elongate fastener.

4. The fastener assembly according to claim 1, wherein the support collar has two recesses on one side of the elongate fastener, and at least three recesses on an opposite side of the elongate fastener.

5. The fastener assembly according to claim 1, wherein the asymmetry comprises an asymmetry in the positions of the recesses.

6. The fastener assembly according to claim 1, wherein the asymmetry comprises an asymmetry in the orientations of the recesses.

7. The fastener assembly according to claim 1, wherein the recesses alternate between the two opposite sides of the elongate fastener, along part of the length of the elongate fastener.

8. The fastener assembly according to claim 1, wherein at least part of one recess on one side of the elongate fastener is situated between at least parts of two recesses on the opposite side of the elongate fastener.

9. The fastener assembly according to claim 1, wherein the at least one recess is generally V-shaped in profile.

10. The fastener assembly according to claim 1, wherein the support collar includes a first end and an opposite second end and a flange on at least one end thereof, which substantially encircles part of the elongate fastener.

11. The fastener assembly according to claim 10, wherein the support collar includes a flange on both the first end and the second end thereof.

12. The fastener assembly according to claim 10, wherein the flange is substantially annular and encircles part of the elongate fastener.

13. The fastener assembly according to claim 10, wherein the flange is inclined with respect to a longitudinal axis of the elongate fastener.

14. The fastener assembly according to claim 13, wherein the maximum distances, of both profiles, from the longitudinal axis of the support collar are substantially equal.

15. A combination of a fastener-driving tool and a fastener assembly, the fastener assembly comprising:
an elongate fastener having a longitudinal axis, and
a support collar mounted on and circumscribing the elongate fastener, the support collar shaped such that it has profiles on opposite lateral sides of the elongate fastener, each profile having at least one recess, the profiles having an asymmetry with respect to each other along the longitudinal axis for at least a part of the length of the of the elongate fastener, wherein the asymmetry comprises an asymmetry in at least one of the number, shapes and sizes of the recesses,
wherein the fastener-driving tool has a fastener supply passage provided with profiles on opposite sides thereof that are asymmetric with respect to each other, and the fastener assembly is arranged to fit in the supply passage.

16. The combination according to claim 15, wherein the asymmetry comprises an asymmetry of the recesses on the opposite lateral sides of the elongate fastener.

17. The combination according to claim 15, wherein the support collar has a single recess on one side of the elongate fastener, and at least two recesses on an opposite side of the elongate fastener.

18. The combination according to claim 15, wherein the support collar has two recesses on one side of the elongate fastener, and at least three recesses on an opposite side of the elongate fastener.

19. The combination according to claim 15, wherein the asymmetry comprises an asymmetry in at least one of the positions and orientations of the recesses.

20. The combination according to claim 15, wherein the recesses alternate between the two opposite sides of the elongate fastener, along part of the length of the elongate fastener.

21. The combination according to claim 15, wherein at least part of one recess on one side of the elongate fastener is situated between at least parts of two recesses on the opposite side of the elongate fastener.

22. The combination according to claim 15, wherein the at least one recess is generally V-shaped in profile.

23. The combination according to claim 15, wherein the support collar includes a first end and an opposite second end and a flange on at least one end thereof, which substantially encircles part of the elongate fastener.

24. The combination according to claim 23 wherein the flange is inclined with respect to a longitudinal axis of the elongate fastener, and the maximum distances of both profiles from the longitudinal axis of the support collar are substantially equal.

* * * * *